United States Patent
Bae et al.

(10) Patent No.: US 8,032,129 B2
(45) Date of Patent: Oct. 4, 2011

(54) METHOD AND APPARATUS FOR STORING DATA USING DLNA NETWORK

(75) Inventors: Young Kyu Bae, Suwon-Si (KR); Ho Chul Shin, Suwon-si (KR); Chul Seung Kim, Seoul (KR); Yun Je Oh, Yongin-si (KR); Joon Oo Kim, Suwon-si (KR)

(73) Assignee: Samsung Electronics Co., Ltd., Yeongtong-gu, Suwon-si, Gyeonggi-do, Korea (KR)

( * ) Notice: Subject to any disclaimer, the term of this patent is extended or adjusted under 35 U.S.C. 154(b) by 411 days.

(21) Appl. No.: 11/652,339

(22) Filed: Jan. 11, 2007

(65) Prior Publication Data

US 2007/0238471 A1   Oct. 11, 2007

(30) Foreign Application Priority Data

Apr. 7, 2006   (KR) ..................... 10-2006-0031739

(51) Int. Cl.
*H04M 3/00* (2006.01)
(52) U.S. Cl. .................. 455/420; 455/414.1; 455/414.2; 455/414.3; 455/414.4; 709/217; 709/219
(58) Field of Classification Search .............. 370/401, 370/428, 389; 455/455, 420, 414.1–414.4; 752/52; 709/217–219
See application file for complete search history.

(56) References Cited

U.S. PATENT DOCUMENTS

| | | | | |
|---|---|---|---|---|
| 2003/0061333 A1* | 3/2003 | Dean et al. | ..................... | 709/223 |
| 2003/0147373 A1* | 8/2003 | Pelaez et al. | ................... | 370/349 |
| 2005/0028208 A1* | 2/2005 | Ellis et al. | ........................ | 725/58 |
| 2005/0117466 A1* | 6/2005 | Strachota | .................. | 369/30.27 |
| 2005/0125082 A1* | 6/2005 | Hanson et al. | .................. | 700/19 |
| 2005/0249230 A1* | 11/2005 | Bennett et al. | ................. | 370/428 |
| 2006/0026291 A1* | 2/2006 | Blackwell et al. | ............. | 709/230 |
| 2006/0029068 A1* | 2/2006 | Frank et al. | ..................... | 370/389 |
| 2006/0064723 A1* | 3/2006 | Poslinski | ......................... | 725/52 |
| 2006/0112417 A1* | 5/2006 | Son et al. | ........................... | 726/3 |
| 2006/0155851 A1* | 7/2006 | Ma et al. | ........................ | 709/226 |
| 2007/0043829 A1* | 2/2007 | Dua | .............................. | 709/219 |
| 2007/0168458 A1* | 7/2007 | Costa-Requena et al. | .... | 709/217 |
| 2007/0211734 A1* | 9/2007 | Yang et al. | ..................... | 370/401 |
| 2007/0234416 A1* | 10/2007 | Matsuoka et al. | .............. | 726/12 |
| 2008/0092211 A1* | 4/2008 | Klemets et al. | ................... | 726/3 |

* cited by examiner

*Primary Examiner* — Jean A Gelin
*Assistant Examiner* — Nathan Taylor
(74) *Attorney, Agent, or Firm* — Cha & Reiter, LLC

(57) ABSTRACT

A Digital Living Network Alliance (DLNA) network that stores, in real time, data, such as motion pictures, still images, audio sounds, etc., collected from outside of the home into a storage device located, preferably, in the home. In particular, a data collecting device requests a device search through the home network, receiving an acknowledgement from a storage device, requests device information from the storage device, receives the device information from the storage device, configures a storage path of the data collecting device using the device information, and stores data it collects into the storage device using the storage path. It is accordingly possible to allow the user to conveniently play back the data collected by the handheld device using the household appliances without additional manipulation for transferring the collected data, despite the limited storage capacity of the handheld device.

18 Claims, 3 Drawing Sheets

METHOD AND APPARATUS FOR STORING DATA USING DLNA NETWORK

CLAIM FOR PRIORITY

Priority is claimed under 35 U.S.C. §119 from Korean Patent Application No. 2006-0031739, which was filed in the Korean Intellectual Property Office on Apr. 7, 2006, the contents of which are herein incorporated by reference in their entirety.

BACKGROUND OF THE INVENTION

1. Field of the Invention

The present invention relates to a Digital Living Network Alliance (DLNA) network and, in particular, to a method and apparatus for storing data (for example, motion pictures, still images, audio sounds, and etc.) collected from outside of the home into a storage device connected to the DLNA network in real time.

2. Description of the Related Art

Recently, various home automation solutions have been proposed and commercialized. Home automation is based on the home networking which allows homeowners to, from outside the house, control household appliances such as a personal computer (PC); communication devices, including a telephone and a television; audio and video (AV) devices, including a digital video disc (DVD) player and a digital camera. The early home automation concept is based on controlling the household appliances independently, using the telephone lines or infrared rays, i.e., without internetworking of the household appliances.

As the technologies developed, home automation has been implemented such that the household appliances and facilities are networked and integrally controlled by a controller. Such an integrally controlled system is called a "home network system."

In the home network system, the household appliances and facilities such as TV, laundry machine, microwave cookery, audio, air conditioner, heating boiler, lights, gas valve, and door locks are associated to a home gateway or a home server such that the household appliances and facilities can be controller by a handheld device (e.g., remote controller) through the home gateway or the home server.

Recently, home network system standardization has been progressed such that the Digital Living Network Alliance (DLNA), especially, is a standard for controlling household appliances. The DLNA, established in June 2003 and formerly called the Digital Home Working Group (DHWG), is an alliance of industry-leading members including Microsoft (MS), International Business Machines (IBM), Hewlett-Packard (HP), Intel, Sony, Matsushita, Samsung, etc. Among the aims of the DLNA is aligning the companies, having industry standards that will allow products from all companies to be compatible with each other, and enabling a network of electronic devices such as TV, VCR, digital camera, and audio components in the home. The DLNA has also focused on the interoperability between networked entertainment and media devices for personal media uses involving imaging, audio and video.

The DLNA defines a PC Internet Network wherein PC and PC peripherals such as a printer communicate; a Mobile Network of multimedia mobile phones, personal digital assistants (PDAs), Motion Pictures Expert Group (MPEG) 1 Audio Layer 3 (MP3) players, laptop computers, and similar devices that provides unparalleled connectivity and freedom of movement into and out of the home environment; and a consumer electronic (CE) network of set-top boxes and traditional consumer electronics. Also, to deliver interoperability in the digital home, DLNA has focused on industry collaboration, standards-based interoperability, and compelling products.

One of the especially key issues of the DLNA is media management and control which enable devices and applications to identify, manage, and distribute media contents across the stationary home network, or to transmit it to a mobile device. UPnP (Universal Plug and Play) Audio/Video (AV) technology addresses all of these needs for the home network and is the media management and control solution for devices developed according to the DLNA interoperability guidelines. Accordingly, DLNA has developed physical media, network transports, media formats, streaming protocols and digital rights management mechanisms on the basis of UPnP.

The internetworking for home network according to DLNA is based on Internet Protocol (IP), which provides underlying network communication for devices on the Internet and allows applications running over different media to communicate transparently.

For example, a PC or an advanced set top box (STB) may stream media contents to a TV in a master bedroom through an Ethernet cable to an 802.11 Access Point, and then wirelessly to the TV. With Internet Protocol (IP), all the DLNA devices can communicate with other devices located anywhere around the world through the Internet.

DLNA is likely to be implemented with a wired fast Ethernet (802.11u) and wireless Ethernet (802.11a/b/g) as the physical layer. Stability of the wired Ethernet has already been proved, and the use of wireless Ethernet, i.e., Wi-Fi, for wireless home networking has become widespread.

DLNA is implemented on the basis of UPnP AV architecture. It is also implemented according to UPnP Device architecture which is used for locating and controlling devices across the DLNA network, i.e., automatically configuring the IP address and recognizing other devices on the network with reference to the IP address, as well as checking and managing services to be provided.

The home network device category is made up of five Device Classes that share system usages in the home network. The five have the same media format and network connectivity requirements. Among them, Digital Media Server (DMS) devices assumes the role, like the Media Server Device in the UPnP AV specification, for providing media acquisition, recording, storage, and sourcing capabilities, as well as content protection enforcement as required. Digital Media Player (DMP) devices assume the role, like the Media Render Device (MRD) and the Media Renderer Control Point (MRCP), for finding, selecting, and controlling playback of contents exposed by a DMS.

Typically, the DLNA system enables the household appliances to share contents and to exchange the contents with outside devices through the Internet.

With the improvement of the transmission speed and quality, and deployment of the wireless communication networks, various wireless contents services have been commercialized with multimedia contents such as motion pictures, MPEG-1 Audio Layer 3 (MP3) files, mobile network games, etc. Also, the wireless contents services have made significant advances in the development of the handheld phone equipped with various functions such as a built-in camera module, which enables the taking of motion picture or photographs.

However, the handheld phone, which tends to become slimmer in design, is limited in its ability to store a large capacity of data. This becomes problematic for large multimedia files such as motion pictures and images.

Also, outputting the collected multimedia file using a household appliance like TV requires copying out the data stored in the handheld phone to that appliance. For example, the data collected by the handheld phone should be transmitted to the TV through an IEEE 1394 cable or a Universal Serial Bus (USB). The conventional method for outputting the data collected by the handheld phone through other electronic device therefore requires connecting the handheld phone with the target device and manipulating them to execute the several commands, resulting in inconvenience to the user.

SUMMARY OF THE INVENTION

The present invention has been made in an effort to solve the above problems, and, in an aspect of the present invention, a method and apparatus are provided for storing, in real time, the data collected by a handheld device into a storage device located at remote place.

In another aspect, data collected by a handheld device is stored regardless of storage capacity limitations of the handheld device.

The above and other aspects are realizable, by way of example, in requesting, by a data collecting device, a device search through the home network; receiving an acknowledgement in response to the device search from a storage device; requesting a device information to the storage device which transmits the acknowledgement; receiving the device information from the storage device; configuring a storage path of the data collecting device using the device information; and storing data collected by the data collecting device into the storage device using the storage path.

Preferably, the device search is transmitted to the home network through the Internet.

Preferably, the storage device is connected to the home network.

Preferably, the device information includes a network address, an available storage capability, and the storage path of the storage device.

Preferably, the step of configuring the storage path includes generating a virtual storage path of the data collecting device using the network address and the storage path of the storage device and establishing a connection between the data collecting device and the storage device using the network address.

Preferably, the step of storing data includes transmitting the data to the storage device in real time.

Preferably, the data is any of motion picture data, image data, and audio data.

The above and other aspects can be accomplished, in one possible realization, by a data collecting device which stores data in a storage device connected to a home network. The data collecting device includes: a communication unit which requests a device search through the home network and receives device information in response to the device search from the storage device; a storage path configuration unit which configures a virtual storage path of the data collecting device using the device information; a data collecting unit which collects data; and a control unit which controls to store the data in accordance with the virtual storage path.

Preferably, the device information includes a network address, an available storage capability, and the storage path of the storage device.

Preferably, the virtual storage path of the data collecting device is generated with the network address and the storage path.

Preferably, the data is any of motion picture data, image data, and audio data.

Preferably, the data is transmitted to be stored into the storage device in real time.

Preferably, data collecting device further includes a mobile communication terminal.

The above and other aspects are realizable, in one exemplary embodiment, by a storage device that includes: a storage unit for storing data; a communication unit which transmits an acknowledgement message in response to a device search request transmitted by the data collecting device and receives a device information request; and a control unit which generates device information in response to the device information request and controls the communication unit to transmit the device information to the data collecting device.

Preferably, the device information includes a network address, an available storage capability, and the storage path of the storage device.

Preferably, the storage path is in the form of a directory structure of a file system.

Preferably, the control unit stores data received from the data collecting device into the storage unit.

BRIEF DESCRIPTION OF THE DRAWINGS

Details of the novel home networking data storage technology are set forth below with the aid of the following drawings, wherein.

DETAILED DESCRIPTION

Detailed discussion of well-known functions and structures incorporated herein is omitted from the following description for conciseness and clarity of presentation.

Figure 1:
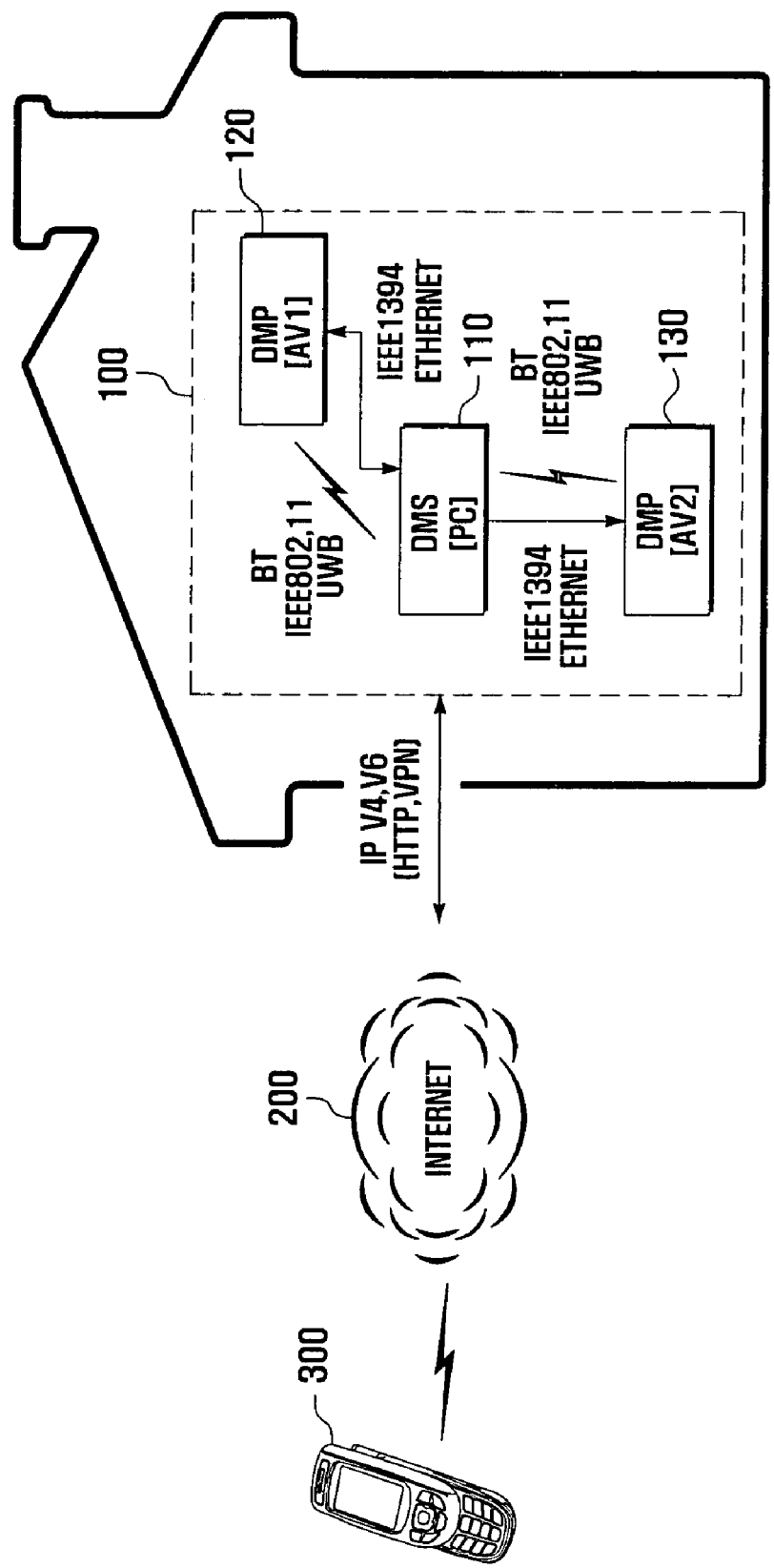
FIG. 1 is a block diagram illustrating a DLNA system according to an embodiment of the present invention.

FIG. 1 depicts, by way of illustrative and non-limitative example, a DLNA system according to an embodiment of the present invention. The DLNA system includes a DLNA network 100 implemented inside the house and a handheld device 300 connected to the DLNA network through the Internet 200.

The DLNA network 100 includes a Digital Media Server (DMS) 110 (e.g., PC) for providing multimedia contents, and a plurality of Digital Media Players (DMPs) 120, 130 (e.g., AV devices) for playing back the multimedia contents provided by the DMS 110. The DMS 110 and the DMPs 120, 130 are interconnected through wired or wireless links.

In the case of wired connection, the DMS 100 and DMPs 120, 130 communicate via, preferably, IEEE 1394 link or Ethernet link. In the case of wireless connection, the DMS 100 and DMPs 120, 130 communicate via, preferably, Bluetooth (BT) link, IEEE 802.11 or Ultra Wide Band (UWB)

link. The DMS 100 can assume the role of home gateway, and the DMPs 120, 130 can be implemented with a Control Point (CP) function.

The DLNA network 100 can connect to the Internet 200 using IPv4 or IPvb, and the handheld device 300 connects to the DLNA network through the Internet 200.

The DLNA system implements sharing of digital contents among various devices associated to the DLNA network 100. For example, the AV contents stored in the DMS 110 can be played back in the DMPs 120, 130.

In the embodiment shown in FIG. 1, the data collected by the handheld device 300 is, through the Internet 200, stored into a DLNA element (e.g., DMS 110) connected to the DLNA network 100.

For this function, the handheld device 300 should retrieve devices connected to the DLNA network 100 through Internet 200, establish a virtual channel using storage information from among the information received from the devices 110 to 130, and transmits the multimedia data to the corresponding device (for example, DMS 110) through the virtual channel.

The DMPs 120, 130 connected to the DLNA network 100 can process the multimedia data stored in the DMS 110 as data stored in local storage (not shown).

Figure 2:
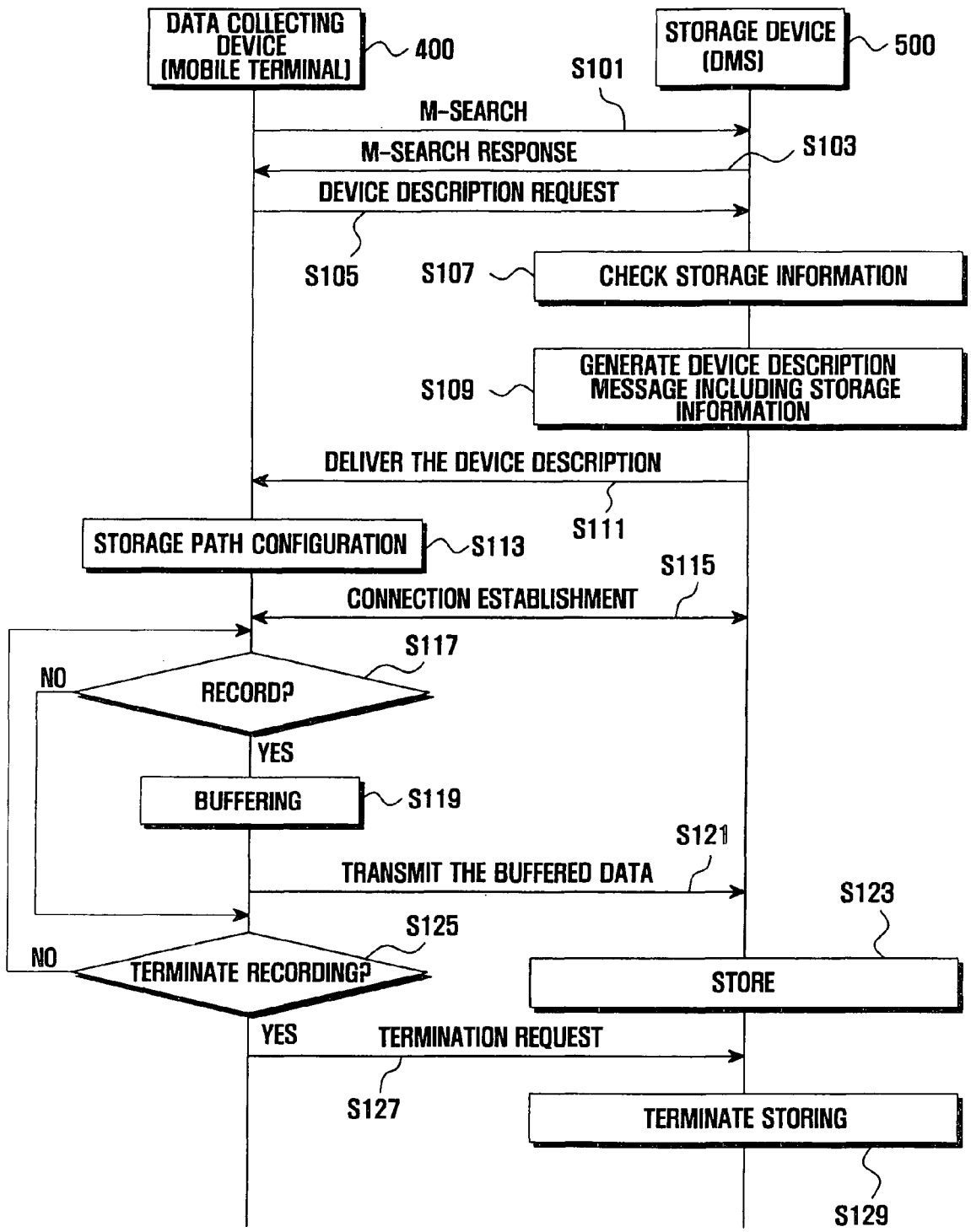
FIG. 2 is a flowchart illustrating a method for storing data using a DLNA network according to an embodiment of the present invention.

FIG. 2 is illustrates, as one example, a method for storing data using DLNA network 100 according to an embodiment of the present invention. The data collected by a data collecting device (for example, handheld device) 400 is processed to be stored into a storage device (for example, DMS) 500.

Initially, the data collecting device 400 requests a device search to the DLNA network 100 through the Internet 200 (S101). The request is carried out by transmitting an M-search message, defined in the DLNA Home Networked Device Interoperability Guidelines v1.5 protocol (hereinafter "DLNA protocol"). In response to the M-search message, the data collecting device 400 receives the M-search response (S103). The data collecting device 400 then requests device information from the device 500 that transmitted the M-search response, by transmitting a device description request message defined in the DLNA protocol (S 105).

Upon receiving the device description request from the data collecting device 400 (S105), the storage device 500 checks storage information (S107). The storage device 500 generates a device description message including the storage information (S109) and then transmits the device description message to the data collecting device 400 (S111). Here, the storage information is the information generated only by the storage device 500 and includes an available storage capacity in megabytes (Mbyte) and storage path (i.e., a directory structure of the file system of the storage device).

Figure 3:
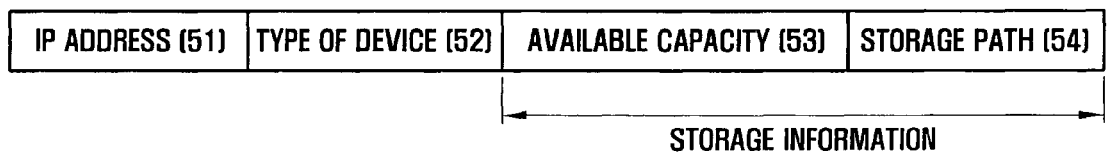
FIG. 3 is an exemplary format for the device description message shown in FIG. 2.

FIG. 3 illustrates an exemplary format for the Device description message transmitted for the storage device 500 to the data collecting device 400. Continuing with the process shown in FIG. 2, upon receiving the device description message, the data collecting device 400 sets the data storage path using the storage information (S113) and then establishes a channel between the data collecting device and the storage device 500 (S115). The network address (e.g., IP address) of the storage device 500 contained in the device description message and the storage path (e.g., directory structure of the file system, "C:\MyStorage\UploadSpace\</storagePath>") are stored as a virtual storage path of the data collecting device 400. The connection between the data collecting device 400 and the storage device 500 is set using the network address (e.g., IP address) of the storage device, which is contained in the device description message.

Once the data recording starts (S117), the data collecting device 400 buffers the data (S119) and then transmits the buffered data to the storage device 500, which is located within the house (S121). It is noted here that the data is being transferred in real time, i.e., captured by the data collecting device and forwarded in real time to a recording medium on the storage device 500. The data collecting device 400 can be, and preferably is, implemented with a low capacity memory for the buffering of the data. The real time nature of the operation permits the use of a small buffer that fits the form factor of a mobile terminal. The buffering is optional and can be foregone in the case of a data collecting device 400 which has no buffer.

The data collecting device 400 repeatedly performs the steps S117 to S121 before the recording is terminated by the users termination instruction or the inner device interrupt (e.g., battery off).

The storage device 500, as mentioned above, stores the data in real time (S123), and terminates the storage process (S129) if a termination request is received from the data collecting device 400 (S127). Accordingly, the storage device 500 can open the file for writing the data stream transmitted from the data collecting device 400 and closes the file when the termination request is received.

The being recorded can be video data, but is not limited to such. Also, although transfer is described above as occurring to a device located within the house, the intended scope of the invention is not so limited.

FIG. 3 is an exemplary illustration of a format for a device description message 50 of the FIG. 2 embodiment.

Referring to FIG. 2 and FIG. 3, the device description message 50 includes an IP address field 51, a type-of-device field 52, an available capacity field 53, and a storage path field 54.

The IP address field 51 contains the IP address of storage device 500 on the DLNA network 100. The DLNA network 100 operates on the basis of the IP such that the IP address field 51 contains the IP address of the storage device 500.

The type-of-device field 52 indicates the type of the storage device 500. The available capacity field 53 and the storage path field 54 indicate the available capacity of the storage device and the storage path information, respectively, when the type of the device is storage device.

The available capacity field 53 indicates the available storage capacity of the storage device 500, i.e., the capacity available for the data collecting device 400, in Mbyte units, and the storage path field 54 indicates a directory path (for example, C:\MyStorage\UploadSpace\</storagePath>) on the basis of the directory structure of the file system of the corresponding storage device 500. Accordingly, the data collecting device 400 sets storage path of the storage device 500 as the storage address of the data collecting device.

Figure 4:
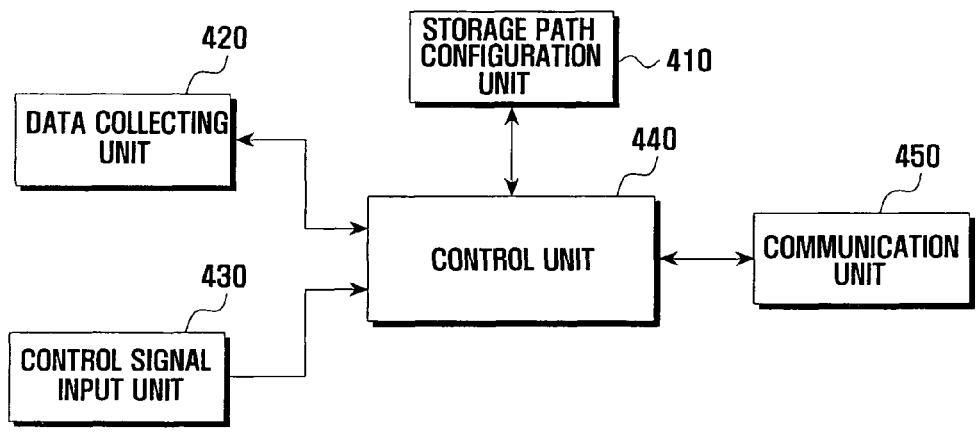
FIG. 4 is a schematic block diagram illustrating a data collecting device of FIG. 2 according to an embodiment of the present invention.

FIG. 4 is a possible design for the data collecting device 400.

The data collecting device 400, according to the embodiment of FIG. 4, includes a storage path configuration unit 410, a data collecting unit 420, a control signal input unit 430, a control unit 440, and a communication unit 450.

The storage path configuration unit 410 configures the storage path of the data collecting device 400. In particular, the storage path configuration unit 410 configures the storage address at which the data collected by the data collecting device 400 is stored. The storage path configuration unit 410 configures the storage path based on the information on the storage device that is received, over the DLNA network 100, by the communication unit 450 and processed under the control of the control unit 440. For example, the storage path configuration unit 410 receives, from the control unit 440, the address (for example, IP address) of the storage device 500 on the DLNA network and the storage path (for example, a directory path in the directory structure of he file system), and configures the connection between the data collecting device 400 and the storage device using the address and the storage path.

The data collecting unit 420 collects data, especially data such as video file, image file, or audio file, according to the control signal inputted by the user through the control signal input unit 430 and according to the control unit 440.

Under the control of the control unit 440, the collected data are stored into the space of the storage device 500 addressed on the basis of the storage path configured by the storage path configuration unit 410. In particular, the control unit 440 receives, from the storage path configuration unit 410, a virtual storage path of the data collecting device 400 matched with the address and storage path of the storage device 500. The control unit 440 then causes the collected data to be stored on the basis of the virtual storage path. More particularly, the control unit 440 receives the virtual storage path from the storage path configuration unit 410 and transmits, in real time, the data collected by the data collecting unit 420 to the communication unit 450 together with the virtual storage path.

The communication unit 450 requests, on the DLNA network 100, the device search mentioned above (S101), and receives the device information 50 from a target device 500 (S111). In this embodiment, the target device 500 is the storage device, although other devices may alternatively serve as the target device. Under the control of the control unit 440, the received device information 50 is transmitted to the storage path configuration unit 410, and the storage path configuration unit configures the virtual storage path of the data collecting device 400 on the basis of the device information.

In order to configure the virtual storage path of the data collecting device 400, the communication unit 450 requests the device information 50 from the device 500 that responded to the device search request. The data collecting device 400 receives the device information 50 which, as mentioned above, includes the network address 51, available storage capability 53, and the storage path of the device 54, and transmits the device information to the control unit 440. Preferably, the communication unit 450 operates under the control of the control unit 440.

Preferably, the data collecting device 400 includes a mobile terminal provided with a camera module.

Figure 5:
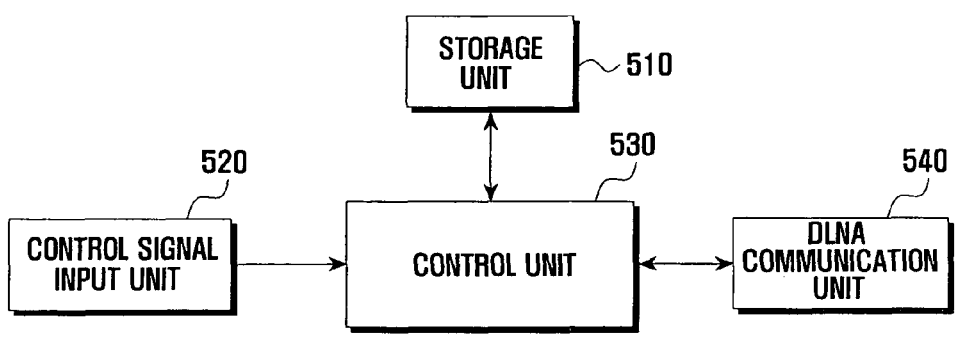
FIG. 5 is a schematic block diagram illustrating a storage device of FIG. 2 according to an embodiment of the present invention.

FIG. 5 provides an example of the storage device 500 of FIG. 2.

The storage device 500 includes a storage unit 510, a control signal input unit 520, a control unit 530, and a DLNA communication unit 540.

The storage unit 510 stores the data, especially, data such as the video and image files transmitted from the data collecting device 400.

The control signal input unit 520 receives the control signal inputted by the user's manipulation and transmits the control signal to the control unit 530.

The control unit 530 controls the operation of the storage device 500 according to the control signal inputted by the user or generated by the operation program. Particularly, the control unit 530 controls the communication unit 540 such that the communication unit transmits an acknowledgement (ACK) message to the data collecting device 400 in response to the device search request, generates the device information 50 upon receiving the device information request from the data collecting device 400, and transmits the generated device information, the device information containing the storage path of the storage unit 5 1 0.

Preferably, the control unit 530 generates the device information message 50.

The communication unit 540 performs communication through the DLNA network 100 under the control of the control unit 540. In particular, the communication unit 540 receives the device search request message over the DLNA network 100, transfers the device search request message to the control unit 530, and transmits the acknowledge message in response to the device search request message under the control of the control unit 530. Also, the communication unit 540 transmits the device information request message received from the data collecting device 400 to the control unit 530 and transmits the device information message 50 generated by the control unit 530.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

In the above embodiments, a procedure for storing the video data recorded by the data collecting device 400 into the storage device 500 through the DLNA network 100 is explained; however, the present invention is applicable to the various other types of data, like the audio data.

As described above, the method and apparatus for storing data using the DLNA network 100 stores, within the house, data collected by the data collecting device 400 located outside the house. This is accomplished by the user without inconvenient manipulation. The collected data can be conveniently played back using the AV devices in the house. In the present invention, the video file taken from outside the house can be played back without additional data transmission manipulation (for example, uploading). Accordingly, it is possible to allow the user to conveniently play back the data collected by the handheld device using the household appliances without additional manipulation for transferring the collected data. According to the present invention, the small storage capability of the handheld device is sufficient, since the data collected by the handheld device is stored into the storage device located in the house in real time.

What is claimed is:

1. A data storage method of a handheld data collecting device using a home network, comprising:
   requesting by the handheld data collecting device a device, a device search through the home network that remotely communicates with the home network using a different communication protocol than the home network uses to communicate with one or more devices while performing a device search through the home network;
   receiving an acknowledgement by the home network in response to the device search for a storage device connected to the home network;
   requesting device information by the home network, to the storage device that transmits the acknowledgement;
   configuring a storage path of the hand held data collecting device to a storage device in the home network by using the received device information; and
   collecting data and storing the collected data in real time into the storage device using the storage path wherein the data collecting device storing the collected data into the storage device, stores the data in a common form that is playable by other devices within the home network that utilize a different format that the handheld data collecting device outside the home that collected the data, and without additional data transmission manipulation for transferring the collected data inside the home network and wherein the data collected by the handheld data collecting device is stored in the storage device for playback by said other devices without uploading.

2. The method of claim 1, wherein the device search is transmitted to the home network through the Internet.

3. The method of claim 1, wherein the device information includes a network address, an available storage capability, and said storage path.

4. The method of claim 3, wherein said configuring comprises:
using the network address and said storage path to generate a virtual storage path of the data collecting device; and
establishing a connection between the data collecting device and said storage device using the network address.

5. The method of claim 1, wherein the storing includes transmitting, in real time, the collected data to the storage device until the entire amount of data has been transmitted to the storage device or a signal to end transmission is received.

6. The method of claim 5, wherein the collected data comprises motion picture data.

7. The method of claim 5, wherein the collected data comprises image data.

8. The method of claim 5, wherein the collected data comprises audio data.

9. A handheld data collecting device which stores data in a storage device connected to a home network, comprising:
a communications unit which requests a device search through the home network and receives, from the storage device connected to the home network an acknowledgement in response to the device search wherein the handheld data collecting device remotely communicates with the home network using a different communication protocol than the home network uses to communicate with one or more devices while performing a device search through the home network;
a storage path configuration unit that uses the received device information in configuring a virtual storage path of the handheld data collecting device;
a data collecting unit which collects data; and
a control unit which requests device information to the storage device that transmits the acknowledgement, receives a device description message comprising the requested device information form the storage device, controls the data collecting unit to collect data without being locally buffered by the data collecting unit, controls the communication unit to transmit the collected data to the storage device in real time using the virtual storage path and stores the collected data into the storage device in a common form that is playable by other devices within the home network and the data collecting device outside the home network without additional data transmission manipulation for transferring the collected data inside the home network,
wherein the device description message includes a, IP address filed, a type of device field, an available capacity field, and a storage field; and
wherein the data collected by the handheld data collecting device is stored in the storage unit for playback by said other devices without uploading.

10. The data collecting device of claim 9, wherein the device information includes a network address, an available storage capability, and the storage path of the storage device.

11. The data collecting device of claim 10, configured for using the network address and said storage path of the storage device in generating the virtual storage path of the data collecting device.

12. The data collecting device of claim 11, wherein the data collecting device includes a mobile communication terminal.

13. The data collecting device of claim 9, wherein the data comprises at least one of motion picture data, image data, and audio data.

14. The data collecting device of claim 9, wherein the data collecting device includes a mobile communication terminal.

15. A storage device connected to a home network for storing data collected by a handheld data collecting device, comprising:
a storage unit for storing data in communication with the home network;
a communication unit which transmits an acknowledgement message in response to a device search request transmitted by the handheld data collecting device that remotely communicates with the home network using a different communications protocol that the home network uses to communicate with one or more device while performing a device search through the home network and receives a device information request, configures a virtual storage path between the handheld data collecting device and the storage device in the home network; and
a control unit which generates a device description message in response to the device information request and controls the communication unit to transmit the generated device information to the handheld data collecting device, to configure the virtual storage path between the handheld data collecting device and the storage device, to receive the collected data transmitted from the handheld data collecting device with out said handheld data collecting device locally buffering the collected data, and controls the storage unit to store the transmitted data from the data collecting device in a common form that is playable by the other devices with the home network and the data collecting device out side the home network with out additional data transmission manipulation for transferring the collected data inside the home network,
wherein the device description message includes a, IP address filed, a type of device field, an available capacity filed and a storage field; and
wherein the data collected by the handheld data collecting device is stored in the storage unit for playback by said other devices without uploading.

16. The storage device of claim 15, wherein the device information includes a network address, an available storage capability, and a storage path of the storage device.

17. The storage device of claim 16, wherein the storage path is in the form of a directory structure of a file system.

18. The storage device of claim 15, wherein the control unit stores data received from the data collecting device into the storage unit.

* * * * *